United States Patent [19]

Steiner

[11] Patent Number: 5,960,382

[45] Date of Patent: Sep. 28, 1999

[54] TRANSLATION OF AN INITIALLY-UNKNOWN MESSAGE

[75] Inventor: Robert C. Steiner, Broomfield, Colo.

[73] Assignee: Lucent Technologies Inc., Murray Hill, N.J.

[21] Appl. No.: 08/888,687

[22] Filed: Jul. 7, 1997

[51] Int. Cl.[6] ................................................. G06F 17/28
[52] U.S. Cl. ........................................... 704/2; 704/5
[58] Field of Search ................................. 704/1–7, 277; 379/88.05, 88.06

[56] References Cited

U.S. PATENT DOCUMENTS

| | | | |
|---|---|---|---|
| 4,615,002 | 9/1986 | Innes | 364/200 |
| 4,809,192 | 2/1989 | Washizuka et al. | 704/2 |
| 4,949,302 | 8/1990 | Arnold et al. | 364/900 |
| 5,338,976 | 8/1994 | Anwyl et al. | 7404/1 |
| 5,339,240 | 8/1994 | Beaverson | 364/419.14 |
| 5,375,164 | 12/1994 | Jennings | 379/88 |
| 5,442,546 | 8/1995 | Kaji et al. | 704/2 |
| 5,546,304 | 8/1996 | Marschner et al. | 364/419.04 |
| 5,640,575 | 6/1997 | Maruyama et al. | 704/2 |
| 5,640,587 | 6/1997 | Davis et al. | 704/2 |

*Primary Examiner*—Forester W. Isen
*Assistant Examiner*—Patrick N. Edouard
*Attorney, Agent, or Firm*—David Volejnicek

[57] ABSTRACT

Translation of an initially-unknown message (101) from one language to another is effected by a translator (102) that uses prototype messages (300–303) that are independent of message variables (% n), whereby a prototype message represents all messages of an individual type that vary from each other in the values of their variables. A multi-tiered multi-node translation tree (104) is constructed from native-language prototype messages (106) that represent all native-language messages that require translation. Strings (e.g., words and numerals) which make up a native-language message (101) are matched in the order in which they appear in the message against the nodes (521–536) of corresponding tiers (501–516) of the tree to reach a node which represents the last string in the message and contains the message identifier (MSG.ID) of the corresponding prototype message. This identifier is used to retrieve the corresponding one of a plurality of foreign-language prototype messages (107). Variables have a first ordering in the identified native-language prototype message and a second ordering in the corresponding foreign-language prototype message. The two orderings are used to determine placement of the variable values, obtained from the native-language message being translated, into the foreign-language prototype message to yield a foreign-language message (108) which is a translation of the native-language message.

9 Claims, 5 Drawing Sheets

```
          200   201   200  201    200       201           200          201   200
         "ACD FRESBEE AGENT BOB SPLIT/SKILL SERVICE HELD ACD CALL OVER 50 SECONDS
101⤻       200     201 200
         MORE THAN 8 TIMES."
                ⋮
                         200              201
101⤻    "THE ANSWER TO YOUR QUERY IS YES."
                ⋮
              200          200
                   201          201   200
101⤻    "SPLIT/SKILL SERVICE PRESENTLY HAS 19 AGENTS."
```

FIG. 3

MSG.ID A    "ACD %1 AGENT %2 SPLIT/SKILL %3 HELD ACD CALL OVER %4 SECONDS MORE THAN %5 TIMES."

300

⋮

301

MSG.ID F    "THE ANSWER TO YOUR QUERY IS YES."
MSG.ID G    "THE ANSWER TO YOUR QUERY IS NO."

302

⋮

MSG.ID N    "SPLIT/SKILL %1 PRESENTLY HAS %2 AGENTS."

MSG.ID A    "EL SPLIT/SKILL %3 DEL AGENTE %2 DE ACD %1 RETUVO UNA LLAMDA DE ACD FOR MA'S DE %4 SEGUNDOS EN MA'S DE %5 OCASIONES."

300

⋮

301

MSG.ID F    "SI' ES LA RESPONSA A SU PREGUNTA."
MSG.ID G    "NO ES LA RESPONSA A SU PREGUNTA."

302

⋮

MSG.ID N    "PRESENTAMENTE HAY %2 AGENTES EN EL SPLIT/SKILL %1."

303

TRANSLATION OF AN INITIALLY-UNKNOWN MESSAGE

TECHNICAL FIELD

This invention relates to language translation of predefined messages, such as announcements, and to user interfaces.

BACKGROUND OF THE INVENTION

Many communications systems and on-line transaction processing systems interact with users, administrators, service personnel, and others by means of announcement, prompt, and other types of messages, which the system outputs and presents in text or audio form. Such systems are quite often designed to generate and present messages in one (native) language. But their use in foreign or multi-lingual countries may require that the messages be presented in a different language or in multiple languages. Of course, the system could be redesigned to have multi-lingual capability. But this is often economically or technically impractical, particularly for existing systems. One reason for that impracticality is the way in which individual messages are constructed: as a string of fixed words interspersed with variables. The system software typically constructs the message whenever it is needed from its individual component elements by using rules which define the structure and grammar of the system's native language. This makes it very difficult if not impossible to modify the software directly to produce a corresponding message in another language. Furthermore, the presence of the variables results in a very large number of possible messages, which makes their translation via standard lookup, pattern-matching, methods unwieldy.

SUMMARY OF THE INVENTION

This invention is directed to solving these and other problems and disadvantages of the prior art. Generally according to the invention, translation of an initially-unknown message is effected using native-language and foreign-language prototype messages that are independent of message variables, whereby a prototype message represents all messages of an individual type. An individual message is identified to belong to a particular type by using the native-language prototype message, and an equivalent foreign-language message is then generated by inserting variable values from the individual message into the foreign-language prototype message that represents the particular message type.

Specifically according to the invention, there is provided a method of and an apparatus for translating a native-language message into a corresponding foreign-language message. The native-language message, which includes a value of a variable, is matched against a plurality of native-language prototype messages to identify a corresponding native-language prototype message, which includes the variable. The plurality of native-language prototype messages preferably represent all native-language messages that require translation. The identification of the prototype native-language message is used to obtain (e.g., retrieve) a corresponding foreign-language prototype message, which also includes the variable. The value of the variable, obtained from the native-language message that is being translated, is then substituted for the variable in the obtained foreign-language prototype message to yield a foreign-language message which corresponds to (i.e., which is a translation of) the native-language message. If the native language message includes values of a plurality of variables, the identified native-language prototype message and the corresponding foreign-language prototype message each includes the plurality of variables. The plurality of the variables have a first ordering in the identified native-language prototype message and a second ordering in the corresponding foreign-language prototype message, and the two orderings are generally different. The substitution step then involves using the first ordering and the second ordering to determine a placement of the values of the variables into the obtained foreign-language prototype message. Preferably, the matching step involves the use of a multi-tiered multi-node tree constructed from the native-language prototype messages, and matching strings (e.g., words and numerals) which make up the native-language message in their order against the nodes of corresponding tiers in the tree to reach a node which represents the last string in the message and contains the message identifier of the corresponding prototype message. This identifier is then used to obtain the corresponding foreign-language prototype message, which has the same identifier.

While the method comprises the steps of the just-characterized procedure, the apparatus effects the method steps. The apparatus preferably includes an effector—any entity that effects the corresponding step, unlike a means—for each step. Further, there is preferably provided a computer-readable medium containing software which, when executed in a computer, causes the computer to perform the method steps.

The translation arrangement handles translation of both fixed and variant (variable-containing) messages. It is relatively compact, fast, and easily integrated into existing systems. Significantly, it requires no changes to be made to the source—the message-generation software—of the messages that must be translated.

These and other advantages and features of the invention will become more apparent from the following descriptions of an illustrative embodiment of the invention considered together with the drawing.

DETAILED DESCRIPTION

Figures 1, 2:
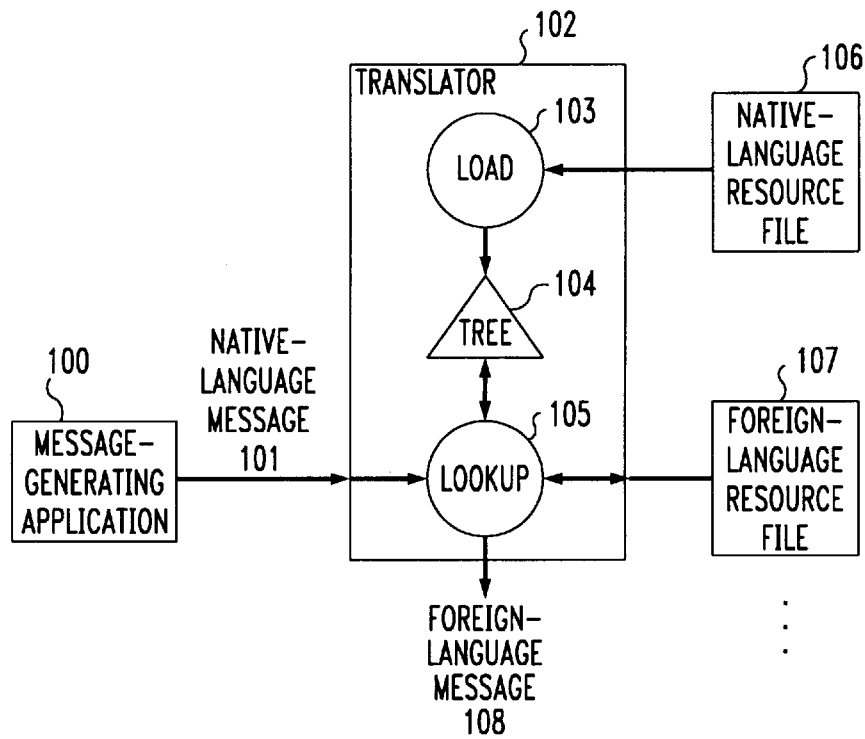

FIG. 1 shows an illustrative message-communication system which includes an illustrative embodiment of the invention. The system includes a message-generating application 100 which generates messages 101 in a native language (e.g., English). Application 100 may be, for example, an interactive voice-response system, or a call-center management system, or any other application that needs to communicate with a user through textual or audio messages. In the prior art, messages 101 are communicated to the user.

According to the invention, however, the system of FIG. 1 includes a translator 102, and messages 101 are communicated to translator 102 where they are translated into a foreign language and then are communicated to the user as foreign-language messages 108. Translator 102 is equipped with a plurality of language resource files 106–107 which contain data that translator 102 needs to effect it functions. Native-language resource file 106 contains definitions of all possible native-language messages 101 that can be generated by application 100. Each foreign-language resource file 107 contains definitions in a different foreign language of messages which correspond one-to-one to the messages defined in file 106. There is a separate file 107 for each foreign language into which translation may be desired.

Application 100 and translator 102 may be either separate storedprogram-controlled machines or separate processes executing on a common machine.

FIG. 2 shows illustrative messages 101 of different types that application 100 may generate. Each message 101 comprises a fixed part 200 and a variant part 201. Fixed part 200 does not change from one to another message 101 of the same type, while variant part 201 may vary from one to another message 101 of the same type. For example, another message 101 of the first-shown type may read "ACD Foosball Agent Joe split/skill Sales held ACD call over 60 seconds more than 10 times." Each variant part 201 comprises one or more ordered variables whose different values form the different messages 101 of a given type. Thus, each message type may be represented by a corresponding single one of prototype messages 300–303 comprising fixed part 200 and the variables, designated %1, %2, %3, etc., which make up variant part 201. Alternatively, for ease of translation, any message type that has a variable whose values need translating is represented by a plurality of prototype messages 301–302 each one of which has a different one of the variable values as a part of its fixed part 210, as shown in FIG. 3. FIG. 3 represents the contents of native-language resource file 106. Each prototype message 300–303 has a different message identifier (MSG.ID) associated therewith.

FIG. 4 shows the contents of an illustrative (Spanish) foreign-language resource file 107. File 107 has the same contents, i.e., prototype messages 300–303 and message IDs, as file 106, but expressed in Spanish and internally ordered according to Spanish grammar. That means that the ordering of variables %1–%n in an English prototype message 300–303 may be different from the ordering of variables %1–%n in a corresponding Spanish prototype message 300–303. To define this ordering, the variables in each native-language (English) prototype message 200–203 are always designated in numerical order (e.g., as %1, %2, %3, %4, %5). The same variables are used in the corresponding foreign-language (Spanish) prototype message 300–303, but are reordered (e.g., %3, %2, %1, %4, %5) to indicate the foreign (Spanish) placement of the variables in the foreign sentence structure. There is no correspondence between variable designations between different prototype messages 300–303. For example, %1 identifies an ACD name variable in prototype message 300, but identifies a split/skill name variable in prototype message 303.

Figure 5:
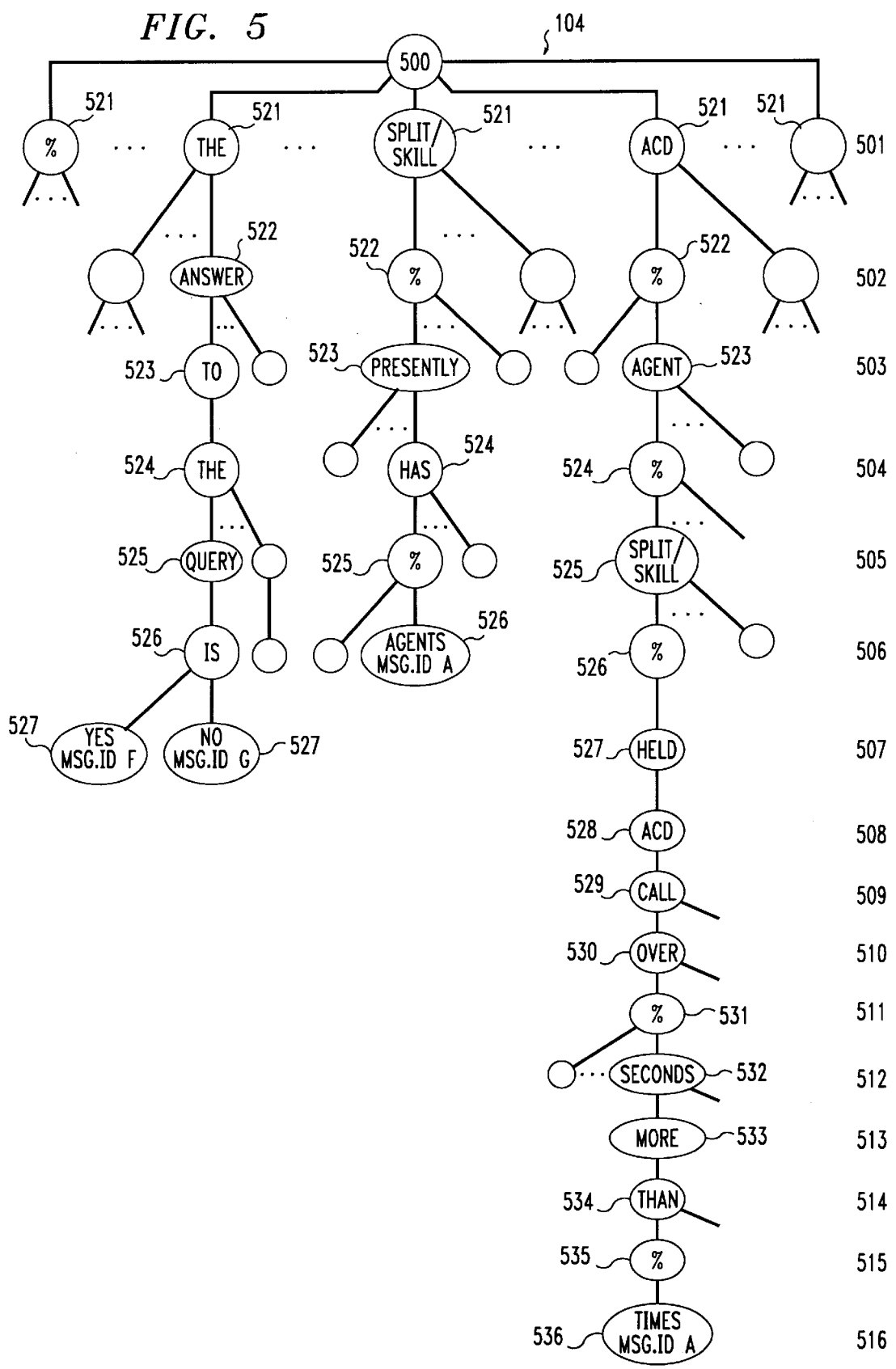

To become initialized for translation, translator 102 executes a load function 103 in order to build a word-based translation tree 104 from the contents of native-language resource file 106, as shown in FIG. 1. Tree 104 has the structure shown in FIG. 5. Following entry point 500, tree 104 has a tier 501 of nodes 521 which represent all words which may be a first word in any message 101. There is also a single node 521 for any and all unknown words, e.g., variable values. Following tier 501, tree 104 has a tier 502 of nodes 522, with different nodes 522 connected to different nodes 521 of tier 501. Each node that has nodes of a lower tier connected to it is called a branch node. Each node 522 which is connected to a particular branch node 521 represents a different word which may be a second word in any message 101 that begins with the word represented by the particular branch node 521. There is again also a single node 522 for any and all unknown words. Following tier 502, tree 104 has a tier 503 of nodes 523 that represent third words in messages, and so on. Any nodes 521–536 of tiers 501–516 that do not have any nodes from a lower tier connected thereto represent the final word in a message 101; they are called leaf nodes, and also have associated with them the message ID of the message type 300–303 of which the corresponding message 101 is a member.

Figure 6:
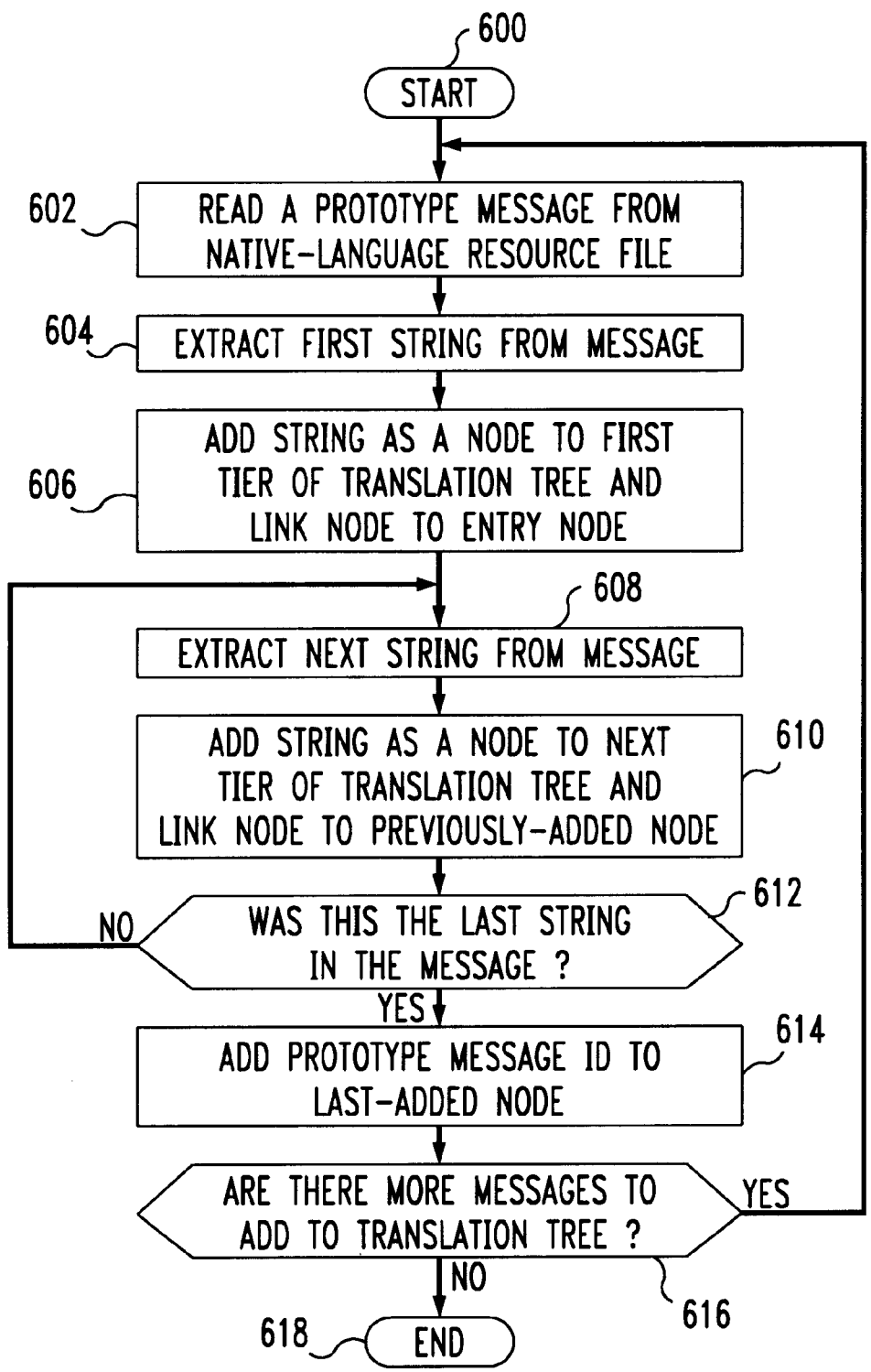

FIG. 6 shows the procedure followed by load function 103 to create tree 104. Upon its invocation, at step 600, function 103 reads one of the prototype messages 300–303 from a native-language collection of strings such as a resource file 106, at step 602. It then extracts a first string (a word or a variable designation) from the message, at step 604, and adds it as a node 521 to tree 104 at first tier 501 and connects it to entry node 500, at step 606. It then extracts the next string from the message, at step 608, and adds it as a node to tree 104 at a next lower tier and links it to the previously-added node at the preceding tier, at step 610. Function 103 then checks if this was the last string of the prototype message, at step 612. If not, function 103 returns to step 608 to add the next string of the prototype message to tree 104. If this was the last string, function 103 adds the prototype message's message ID to the last-added node, at step 614. Function 103 then checks whether there are more prototype messages in file 106 that have not been added to tree 104, at step 616. If so, function 103 returns to step 602 to add another prototype message to tree 104. When all prototype messages from file 106 have been added to tree 104, function 103 ends its execution, at step 618. Translator 102 is now ready to perform translations.

Figure 7:
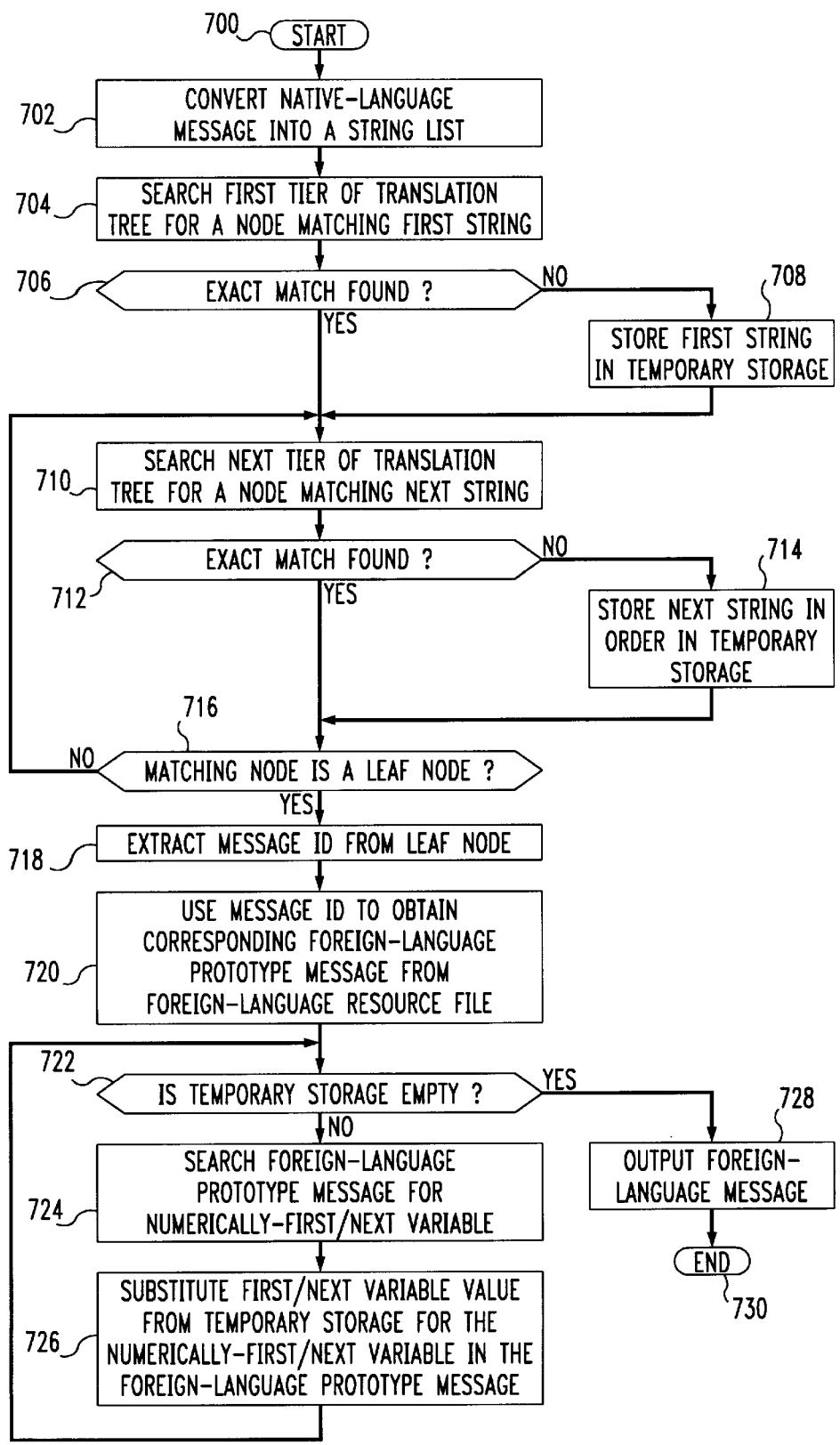

When message-generation application 100 generates a message 101, translator 102 receives the message 101 and invokes a lookup function 105 to parse, identify, and translate the message 101. The procedure followed by lookup function 105 is shown in FIG. 7. Upon its invocation, at step 700, function 105 neither knows nor recognizes the received message 101, nor distinguishes its fixed parts 200 from its variable parts 201. Function 105 converts message 101 into a list of strings (words and numerals) that make up the received message 101, at step 702, by removing white space (separations between strings) from the message 101. Illustratively, function 105 uses the same parser for this purpose as load function 103 used to construct translation tree 104. Function 105 then searches tree 104 for a match for the received message 101. Function 105 first searches first tier 501 of tree 104 for a node 521 that matches the first string in the message 101, at step 704. If the only match is the variable/unknown node 521 (i.e., the string has no exact match among nodes 521), as determined at step 706, function 105 stores the string in ordered temporary storage 780 (e.g., a stack), at step 708. If an exact match for the string is found, function 105 searches nodes at the next lower layer that are linked to the matching node for a node that matches the next string in the message 101, at step 710. Again, if the only match is the variable/unknown node at the searched level, as determined at step 712, function 105 stores the string in ordered temporary storage 780, at step 714. Function 105 then checks whether the matching node is a leaf node, at step 716. If not, function 105 returns to step 710 to search the next level of tree 104 for a match for the next string in the message 101. If the matching node is a leaf node, an exact match for the received message 101 has been found in tree 104, and function 105 extracts the message ID from the leaf node, at step 718. Function 105 then uses the message ID to obtain the corresponding foreign-language prototype message 300–303 that has the same message ID from foreign-language resource file 107, at step 720. If the message 101 has any variables, i.e., temporary storage 780 is not empty, as determined at step 722, function now substitutes the variable values from temporary storage 780 into the foreign-language prototype message 300–303. The variable values are stored in temporary storage 780 in the order in which they were encountered in the native-language message 101, i.e., %1, %2, %3, %4, etc. Function 105 therefore searches the foreign-language prototype message 300–303 for the first variable %1, at step 724, and upon finding it, substitutes the first variable value from temporary storage 780 for the first variable %1, at step 726. Function then returns to step 722 to check for any other variables in the message. If there are more variables, i.e., temporary storage 780 is not empty, function 105 searches the foreign-language prototype message 300–303 for the second variable %2, at step 724, and upon finding it substitutes the second variable value from temporary storage 780 for the second variable %2, at step 726. Function 105 repeats steps 722–726 until temporary storage 780 is empty, at which time it outputs the foreign-language message 108 which resulted from the foreign-language prototype message 300–303 and which is the translation of the received native-language message 101, at step 728, and ends its execution, at step 730.

Of course, various changes and modifications to the illustrative embodiment described above will be apparent to those skilled in the art. For example, instead of representing messages of the same type that have a variable whose values need translating as a plurality of different prototype messages, these messages may be represented by a single prototype message, and the value of its variable may be translated when it is obtained from the message that is being translated and prior to its insertion into the foreign-language prototype. Or, the upper-case/lower-case sensitivity of the mechanism may be preserved or turned off. Furthermore, the mechanism can be used in environments other than language translation, such as pattern matching (e.g., parsing of documents), on a per-word or a per-phrase basis. Such changes and modifications can be made without departing from the spirit and the scope of the invention and without diminishing its attendant advantages. It is therefore intended that such changes and modifications be covered by the following claims.

The invention claimed is:

1. A method of translating a native-language message into a corresponding foreign-language message, comprising the steps of:

matching the native-language message that includes values of a plurality of variables against a plurality of native-language prototype messages to identify a corresponding native-language prototype message that includes the plurality of the variables;

using the identification to obtain a corresponding foreign-language prototype message that includes the plurality of the variables, the identified native-language prototype message and the corresponding foreign-language prototype message each including the plurality of the variables each identified in both said prototype messages by a corresponding unique identifier, the plurality of the variables and their identifiers having a first ordering in the identified native-language prototype message and a second ordering in the corresponding foreign-language prototype message;

using the first ordering and the second ordering of the identifiers of the variables to determine a placement of the values of the variables into the obtained foreign-language prototype message; and substituting the values of the variables for the variables in the obtained foreign-language prototype message according to the determined placement to yield a foreign-language message corresponding to the native-language message.

2. The method of claim 1 wherein:

the step of using comprises the step of using an identity of the identified native-language prototype message to identify the corresponding foreign-language prototype message.

3. The method of claim 1 wherein:

the plurality of native-language prototype messages represent all native-language messages requiring translation.

4. The method of claim 1 wherein:

the step of matching comprises the step of in a message tree comprising the plurality of native-language prototype messages, the message tree having a plurality N of tiers each comprising at least one node each representing a string included in the native-language prototype messages such that an ith tier, where i=1 . . . N, comprises nodes corresponding to all strings that are an ith string in any of the native-language prototype messages, and any individual node in the ith tier is linked to all nodes in an adjacent (i+1)st tier which represent all strings that are an (i+1)st string in any of the native-language prototype messages having the string represented by the individual node as the ith string in the message, and wherein any node in an ith tier which is not linked to any node in an (i+1)st tier represents a last string in one of the native-language prototype messages and has associated therewith a message identifier of that one native-language prototype message, matching strings of the native-language message in their order against the nodes of corresponding said tiers of the tree to reach a node that has associated therewith the message identifier; and using the message identifier to identify the corresponding foreign-language prototype message.

5. The method of claim 4 wherein:

a collection of the native-language prototype messages is included for use in generating the message tree;

a collection of the foreign-language prototype messages and their message identifiers is included for use in obtaining the corresponding foreign-language prototype message; and a native language prototype message and the corresponding foreign-language prototype message have a same message identifier.

6. An apparatus for translating a native-language message into a corresponding foreign-language message, comprising:

means for matching the native-language message that includes values of a plurality of variables against a plurality of native-language prototype messages to identify a corresponding native-language prototype message that includes the plurality of the variables;

means cooperative with the matching means, for using the identification to obtain a corresponding foreign-language prototype message that includes the plurality of the variables, the identified native-language prototype message and the corresponding foreign-language prototype message each including the plurality of the variables each identified in both said prototype messages by a corresponding unique identifier, the plurality of the variables and their identifiers having a first ordering in the identified native-language prototype message and a second ordering in the corresponding foreign-language prototype message;

means, cooperative with the using means, for using the first ordering and the second ordering of the identifiers of the variables to determine a placement of the values of the variables into the obtained foreign-language prototype message; and means cooperative with the determining means, for substituting the values of the variables for the variables in the obtained foreign-language prototype message according to the determined placement to yield a foreign-language message corresponding to the native-language message.

7. An apparatus for translating a native-language message into a corresponding foreign-language message, comprising:

an effector of matching the native-language message that includes values of a plurality of variables against a plurality of native-language prototype messages to identify a corresponding native-language prototype message that includes the plurality of the variables;

an effector of obtaining a corresponding foreign-language prototype message that includes the the plurality of the variables, by using the identification, the identified native-language prototype message and the corresponding foreign-language prototype message each including the plurality of the variables each identified in both said prototype messages by a corresponding unique identifier, the plurality of the variables and their identifiers having a first ordering in the identified native-language prototype message and a second ordering in the corresponding foreign-language prototype message;

an effector of using the first ordering and the second ordering of the identifiers of the variables to determine a placement of the values of the variables into the obtained foreign-language prototype message; and an effector of substituting the values of the variables for the variables in the obtained foreign-language prototype message according to the determined placement to yield a foreign-language message corresponding to the native-language message.

8. An apparatus that effects the method of claim 1 or 2 or 4 or 5.

9. A computer-readable medium containing software which, when executed in a computer, causes the computer to perform the steps of claim 1 or 2 or 3 or 4 or 5.

* * * * *